US006754374B1

(12) United States Patent
Miller et al.

(10) Patent No.: US 6,754,374 B1
(45) Date of Patent: Jun. 22, 2004

(54) METHOD AND APPARATUS FOR PROCESSING IMAGES WITH REGIONS REPRESENTING TARGET OBJECTS

(75) Inventors: Michael I. Miller, Jackson, NH (US); Ulf Grenander, Providence, RI (US); Sarang C. Joshi, Baltimore, MD (US)

(73) Assignee: Surgical Navigation Technologies, Inc., Louisville, CO (US)

( * ) Notice: Subject to any disclaimer, the term of this patent is extended or adjusted under 35 U.S.C. 154(b) by 0 days.

(21) Appl. No.: 09/461,241

(22) Filed: Dec. 16, 1999

Related U.S. Application Data

(60) Provisional application No. 60/114,716, filed on Dec. 16, 1998.

(51) Int. Cl.[7] ................................. G06K 9/00
(52) U.S. Cl. ........................... 382/128; 382/257
(58) Field of Search ......................... 382/128, 154, 382/294, 130, 131, 257; 600/424, 425; 128/922

(56) References Cited

U.S. PATENT DOCUMENTS

| | | | |
|---|---|---|---|
| 5,675,720 A | 10/1997 | Sato et al. | 395/119 |
| 5,734,739 A | 3/1998 | Sheehan et al. | 382/128 |
| 5,768,413 A | 6/1998 | Levin et al. | 382/173 |
| 5,784,431 A | 7/1998 | Kalend et al. | 378/65 |
| 5,841,958 A | 11/1998 | Buss et al. | 395/140 |
| 5,871,018 A | 2/1999 | Delp et al. | 128/898 |
| 5,898,797 A | 4/1999 | Weiss et al. | 382/199 |
| 5,999,840 A | 12/1999 | Grimson et al. | 600/424 |
| 6,112,112 A * | 8/2000 | Gilhuijs et al. | 600/425 |
| 6,175,655 B1 * | 1/2001 | George et al. | 382/257 |
| 6,278,457 B1 | 8/2001 | Bernardini et al. | 345/440 |
| 6,300,958 B1 | 10/2001 | Mallet | 345/442 |
| 6,363,163 B1 * | 3/2002 | Xu et al. | 382/130 |
| 6,366,800 B1 | 4/2002 | Vining et al. | 600/425 |
| 6,393,159 B1 | 5/2002 | Prasad et al. | 382/259 |

FOREIGN PATENT DOCUMENTS

| | | | |
|---|---|---|---|
| WO | WO 97/09690 | 3/1997 | G06K/9/00 |
| WO | WO 98/01818 | 1/1998 | G06K/9/00 |
| WO | WO 99/24932 | 5/1999 | G06K/9/00 |

OTHER PUBLICATIONS

National Library of Medicine, "The VIsual Human Project", (http://www.nlm.nih.gov/research/visible/getting_data.html as archived by the Wayback Machine at www.archive.org on Dec. 2, 1998), pp. 1–2.*

Ruzena Bajcsy et al., "Multiresolution Elastic Matching", Computer Vision Graphics and Image Processing, US, Academic Press, Duluth, MN, vol. 46, No. 1, Apr. 1, 1989, pp. 1–21.

(List continued on next page.)

*Primary Examiner*—Leo Boudreau
*Assistant Examiner*—Ryan J. Miller
(74) *Attorney, Agent, or Firm*—Senniger, Powers, Leavitt & Roedel

(57) ABSTRACT

An apparatus and method for processing images with regions representing target objects involves registering a first and a second image, where the second image contains a target object. The method comprises the steps of identifying a region in the second image containing one or more image data elements representing the target object, transforming the second image to reduce the size of the region containing the target object, and registering the first image and the second image. Another embodiment comprises the steps of identifying a region in the second image containing one or more image data elements representing a target object. After identifying this region, the first and second images are registered using a first transform component that filters one or more data elements in the second image that are contained in the identified region, and a second transform component that includes one or more data elements in the second image that are contained in the identified region.

34 Claims, 5 Drawing Sheets

OTHER PUBLICATIONS

Morrow et al., "Region–Based Contrast Enhancement of Mammograms", IEEE Transactions on Medical Imaging, US, IEEE Inc., New York, vol. 11, No. 3, Sep. 1, 1992, pp. 392–406.

Revol et al., "A New Minimum Variance Region Growing Algorithm for Image Segmentation", Pattern Recognition Letters, NL, North–Holland Publ. Amsterdam, vol. 18, No. 3, Mar. 1, 1997, pp. 249–258.

Perry et al., "Segmentation of Non–Random Textures Using Zero–Crossings", Proceedings of the International Conference on Systems, Man and Cybernetics, US, New York, IEEE, 1989, pp. 1051–1054.

PCT International Search Report, May 11, 2000, PCT International Application No. PCT/US 99/29798.

Morrow, W.M. et al., "Region–Based Contrast Enhancement of Mammograms," IEEE Transactions on Medical Imaging, U.S., IEEE Inc., New York, vol. 11, No. 3, pp. 392–406, ISSN: 0278–0062 (1992).

Revol, C.,et al. "A New Minimum Variance Region Growing Algorithm for Image Segmentation," Pattern Recognition Letters, NL, North–Holland Publ. Amsterdam, vol. 18, pp. 249–258, ISSN: 0167–8655 (1997).

Perry, A.., et al., "Segmentation of Non–Random Textures Using Zero–Crossings," Proceedings of the International Conference on Systems, Man and Cybernetics, US, New York, IEEE, pp. 1051–1054, (1989).

Bird, W.F., et al., "Towards Automated Brachytherapy Film Implant Labeling Using Statistical Pattern Recognition," Proceedings of the Symposium on Computer–Based Medical Systems, US, Los Alamitos, IEEE Comp. Soc. Press, vol. Symp. 7, pp. 146–151, ISBN: 0–8186–6257–3 (1994).

Bajcsy, R. et al., "Multiresolution Elastic Matching," Computer Vision Graphics and Image Processing, U.S., Academic Press, Duluth, MA, vol. 46, No. 1, pp. 1–21, (1989).

Sorlie, C., et al., "Matching of Digitised Brain Atlas to Magnetic Resonance Images," Medical and Biological Engineering and Computing, GB, Peter Peregrinus Ltd., vol. 35, No. 3, pp. 239–245, ISSN: 0140–0118, (1997).

* cited by examiner

METHOD AND APPARATUS FOR PROCESSING IMAGES WITH REGIONS REPRESENTING TARGET OBJECTS

RELATED APPLICATION

This patent application claims priority to U.S. provisional patent application 60/114,716 filed Dec. 16, 1998, which is herein incorporated by reference in its entirety.

BACKGROUND OF THE INVENTION

The present invention relates to image processing systems and methods, and more particularly to image processing systems that process images with regions representing target objects.

Image registration is an image processing technique for combining two or more images, or selected points from the images, to produce a composite image containing data from each of the registered images. During registration, a transformation is computed that maps related points among the combined images so that points defining the corresponding structures in each of the combined images are correlated in the composite image.

Image processing techniques suitable for image registration follow two different approaches. The first requires that an individual with expertise in the structure of the object represented in the images label a set of landmarks in each of the images that are to be registered. For example, when registering two MRI images of different axial slices of a human head, a physician may label points, or a contour adjacent to these points, corresponding to the cerebellum in two images. The two images are then registered by relying on a known relationship among the landmarks in the two brain images. The second currently-practiced technique for image registration uses the mathematics of small deformation multi-target registration and is image data driven. Here, volume based imagery is generated of the two targets from which a coordinate system transformation is constructed.

Conventional image processing techniques may not adequately take into account the existence of anomalies in an image that can limit performance when registering target images with corresponding atlas images that do not contain representation of anomalies. There is, therefore, a need for an image processing system that overcomes the limitations of the conventional techniques.

SUMMARY OF THE INVENTION

The present invention provides a methodology for image processing that can compensate for the presence of target objects in images.

Additional features and advantages of the invention will be set forth in the description which follows, and in part, will be apparent from the description, or may be learned by practicing the invention. The objectives and other advantages of the invention will be realized and obtained by the method and apparatus particularly pointed out in the written description and the claims hereof as well as in the appended drawings.

To achieve these and other advantages and in accordance with the purpose of the invention, as embodied and broadly described, a method and apparatus according to the invention registers a first and a second image, where the second image contains a target object. The method comprises the steps of identifying a region in the second image containing one or more image data elements representing the target object, transforming the second image to reduce the size of the region containing the target object, and registering the first image and the second image.

Another embodiment consistent with the present invention registers a first image and a second image. A method comprises the steps of identifying a region in the second image containing one or more image data elements representing a target object. After identifying this region, the first and second images are registered using a first transform component that filters one or more data elements in the second image that are contained in the identified region, and a second transform component that includes one or more data elements in the second image that are contained in the identified region.

Both the foregoing general description and the following detailed description are exemplary and explanatory and are intended to provide further explanation of the invention as claimed.

DESCRIPTION OF THE FIGURES

The accompanying drawings, which are incorporated in and constitute part of the specification, illustrate a presently preferred embodiment of the invention and together with the general description given above and detailed description of the preferred embodiment given below, serve to explain the principles of the invention.

FIG. 5 is a flow diagram of an image processing method for automatically removing image data elements corresponding to an object embedded in an image in accordance with the present invention;

FIG. 7 is a flow diagram of a method for registering a target image and an atlas image in accordance with the present invention.

DETAILED DESCRIPTION OF THE INVENTION

A method and system is disclosed which locates objects in image data. The accompanying drawings, which are incorporated in and constitute part of the specification, illustrate a presently preferred embodiment of the invention and together with the general description given above and detailed description of the preferred embodiment given below, serve to explain the principles of the invention.

In many applications requiring image analysis, a technician must visually inspect several images and engage in a labor intensive process of manually labeling regions of interest in the images. The term "region" as used herein includes one or more image data elements. An image data element includes, for example, a pixel or a voxel. A method consistent with the present invention helps an operator to locate regions in an image representing objects such as structural anomalies. The method begins with an image containing one or more target objects of interest. For example, consider an image of a human brain acquired using a magnetic resonance imager (MRI). A physician or technician can use the method to determine the extent of a mass effect tumor present in the image. A mass effect tumor is a tumor that displaces the tissue of surrounding structures. Thus, this type of tumor is an example of the type of object that can be localized in an image for subsequent analysis.

Figure 1:
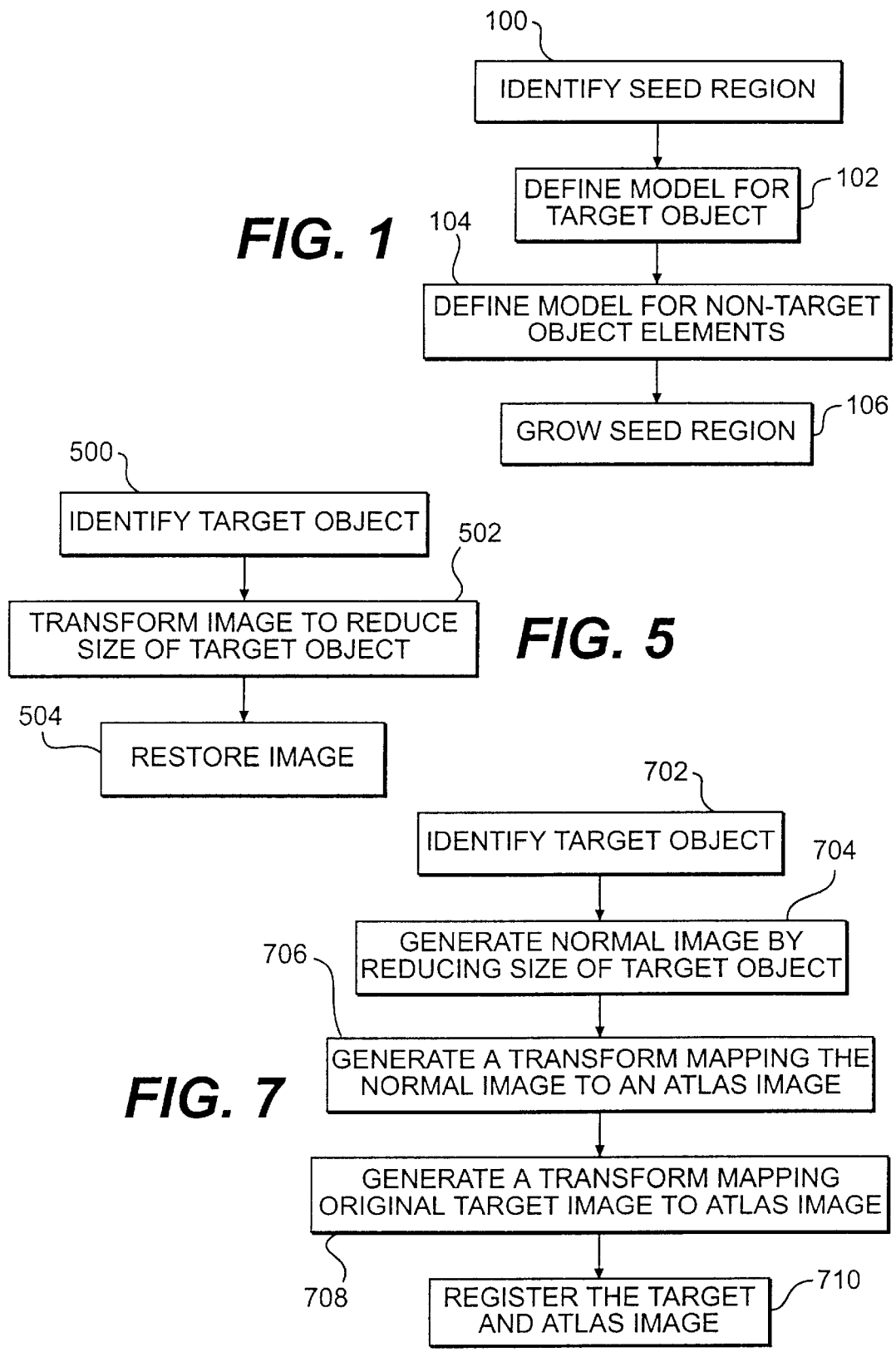
FIG. 1 is a flow diagram of a method for growing a seed region in accordance with the present invention.

The first step of the method shown in FIG. 1 identifies a seed region in the image containing at least one data element representing diseased tissue located in the tumor (step 100). The seed region can be identified in any of a number of ways. For example, a computer system can identify a data element in the MRI that represents the tumor. One suitable technique would use histogram or thresholding algorithms known in the art to identify a candidate seed region representing a portion of the tumor. Alternatively, an operator can identify the seed region by selecting a data element or group of data elements in the image representing a portion of the tumor.

A mathematical texture or intensity model (or a model that embodies both texture and intensity) is then defined for data elements representing diseased tissue in the tumor and normal tissue in the image (steps 102 and 104, respectively). Texture and intensity models define the distribution of the gray scale values of data elements in an image. Moreover, texture can be modeled as a structured variation of intensity. There are a number of possible texture and intensity models known in the art that are suitable for the present method, including, but not limited to Gaussian and mixtures of Gaussian distributions. Gaussian-based distributions, like other types of parametric statistical distributions, are appropriate models to use because the models can be adapted to the image by modifying only a few parameters, such as the mean and variance of the distribution. The models can be selected by software that inspects the tumor region and normal region of the image and selects appropriate models by, for example, estimating a mean and variance of the data elements in the regions of interest. Alternatively, an operator can specify appropriate models.

After the appropriate texture or intensity models are defined, the seed region is grown to increase the number of data elements representing the tumor contained in the seed region, while decreasing the number of data elements representing normal tissue contained in the seed region (step 106). In an embodiment consistent with the present invention, the method seeks to maximize the number of data elements representing the tumor contained in the seed region, while minimizing the number of data elements representing normal tissue contained in the seed region. The result of the operation of this method is to define a boundary in the image that encloses the tumor, but does not include significant amounts of normal tissue not affected by the tumor.

Figure 2:
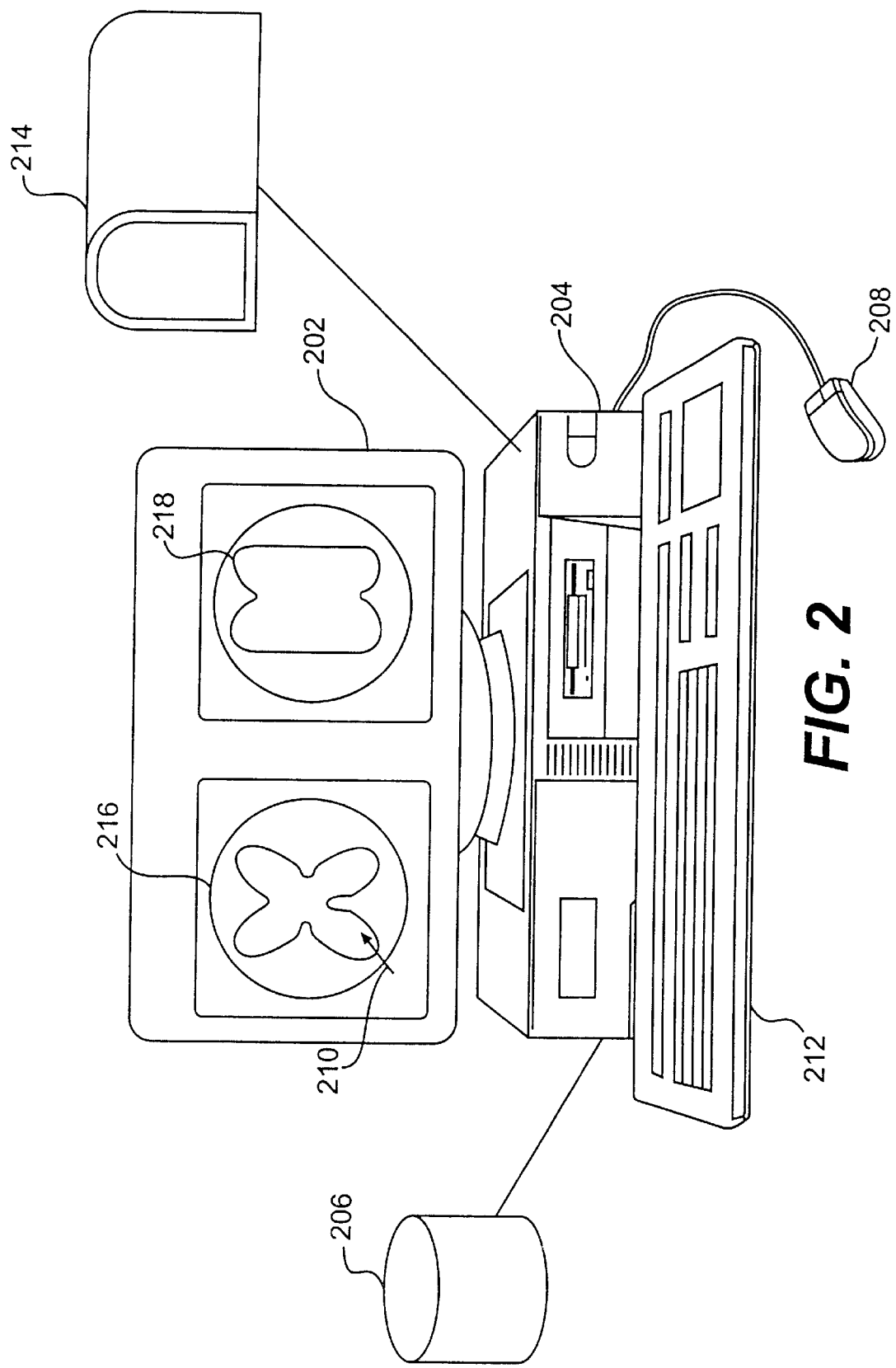
FIG. 2 is schematic diagram illustrating an apparatus for processing images in accordance with the present invention.

FIG. 2 is an apparatus for implementing embodiments consistent with the present invention. Each of the described techniques involves computations that are preferably executed in hardware and/or software stored in a computer system. The images that are processed are acquired from imaging devices during processing and/or are retrieved from storage devices. For example, medical imaging scanner 214 obtains images and stores them on a computer memory 206 which is connected to a computer central processing unit (CPU) 204. One of ordinary skill in the art will recognize that a parallel computer platform having multiple CPUs is also a suitable hardware platform for the present invention, including, but not limited to, parallel machines and workstations with multiple processors. Computer memory 206 can be directly connected to CPU 204, or this memory can be remotely connected through a communications network. Moreover, the computational operations described herein can be allocated among several devices in a distributed network, including, but not limited to, networks linked by the Internet. The computer system of FIG. 2 also can include user interfaces for operator input. The interfaces include keyboard 212 and mouse 208, which controls cursor 210. Display 202 has windows 216 and 218.

An embodiment of a process consistent with the present invention for growing a surface from a seed sphere to define the bounding surface of the tumor estimates a closed surface M which reduces an elastic regularization energy while increasing the data log-likelihood associated with the texture characteristics of the diseases and normal anatomy. Consider, for example, a target anatomical imagery I(x) in a region of interest $\Omega$. Begin by first defining a texture model for the interior and the exterior of diseased region of interest. An example of such a model is an independent Gaussian texture model with different mean and variances for the interior and the exterior. Let $\mu_{int}$, $\sigma^2_{int}$ be the mean and variance of the Gaussian texture of the tumor. Let $\mu_{Ext}$, $\sigma^2_{Ext}$ be the mean and variance of the Gaussian texture of the exterior or the normal anatomy surrounding the tumor. This defines the data likelihood model. Let M be a closed triangulated surface with interior $M_{int}$. Then the energy defined by the texture model and the surface M becomes:

$$L(M) = \int_{M_{int}} \frac{(I(x) - \mu_{int})^2}{2\sigma^2_{int}} dx + \int_{M^c_{int}} \frac{(I(x) - \mu_{Ext})^2}{2\sigma^2_{Ext}} dx$$

A regularization energy is selected for the prior that constrains the estimate of the surface to be smooth. For defining the regularization energy the surface lattice is preferably modeled as an elastic sheet. The energy is then locally given by the distance between the sites in the lattice.

Let $\{x_i \epsilon M, i=1, \ldots, M\}$ be the vertices of a triangulated graph. Preferably the vertices $\{x_i \epsilon M, i=1, \ldots, M\}$ of the triangulation minimize an energy which is based on the distance of the vertex to it's neighbors. Define the neighborhood $N(x_i)$ as the set of all neighbors of vertex $x_i$ in the triangulated graph. Let $n_{x_i}$ be the outward normal at each vertex. The elastic energy associated with the surface M is defined as $$H(M) = \sum_{i=1}^{N} \sum_{j \in N(x_i)} |x_i - x_j|^2.$$

The estimate of the bounding surface M is then given by $$M = \arg\min L(M) + \alpha H(M), M$$

where $\alpha$ is the Language multiplier. A preferred iterative gradient algorithm for generating a surface minimizing combined energy is:

Initialize $(M)$ to a seed sphere in the tumor.;

Input $(\mu_{int}, \sigma^2_{int}, \mu_{ext}, \sigma^2_{ext})$;

for $i: = 1$ to $M$ do

-continued

Compute $(N(x_i))$;

end

Initialize $(d_i)$;

Set step-size $\epsilon$;

while $(sup_i|d_i|) > \text{threshold}$ do for $i := 1$ to $M$ do

Figure 3:
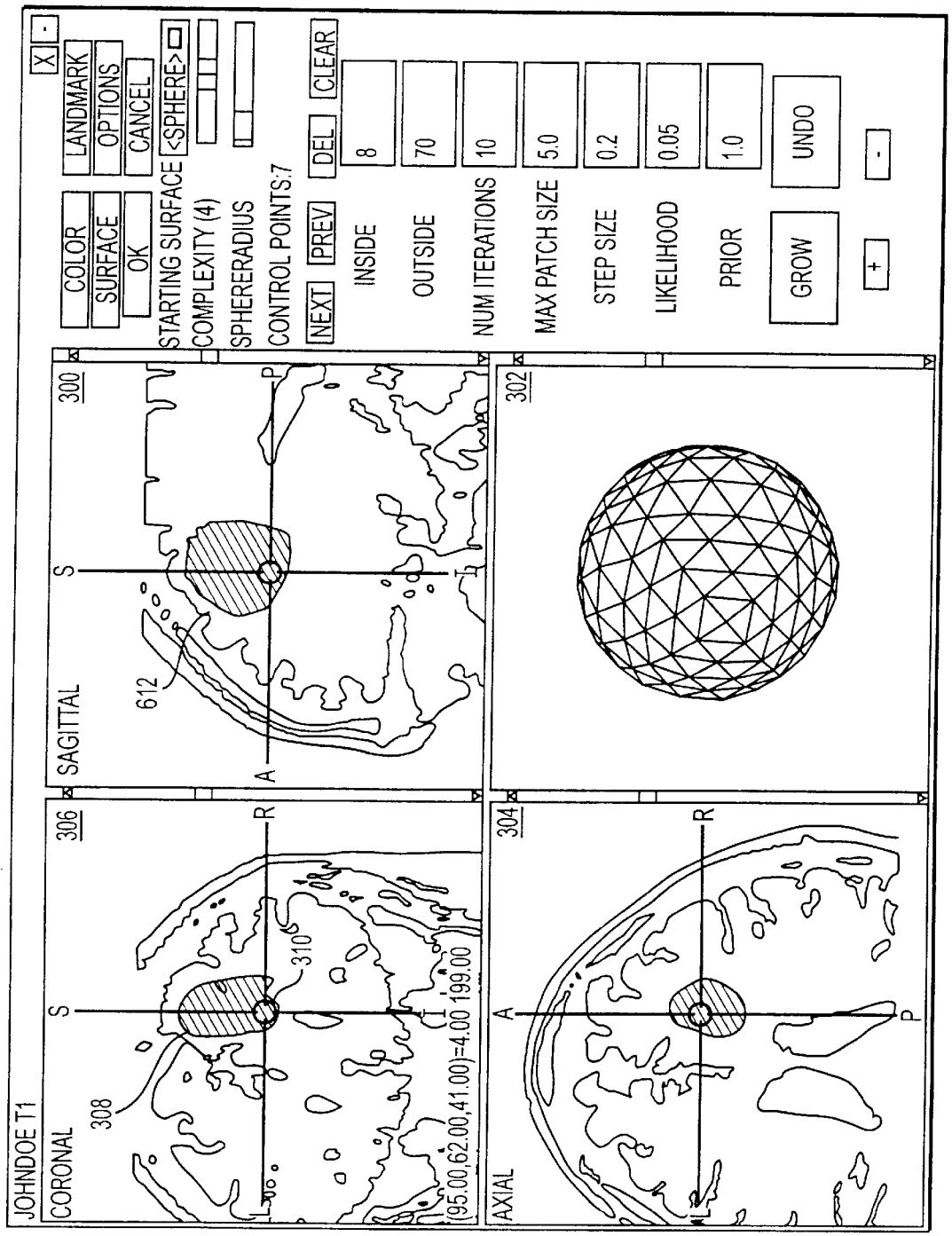
FIG. 3 is a computer display of coronal, sagittal, and axial views of a head image containing a tumor with a defined seed region.

Compute $(n_{x_i})$;

$$c_i := 2 \sum_{j \in N(x_i)} (x_j - x_i);$$

$$d_i = \alpha \frac{1}{\|n_{x_i}\|} \langle c_i, n_{x_i} \rangle + \left[ \frac{(I(x_i) - \mu_{int})^2}{\sigma_{int}^2} - \frac{(I(x_i) - \mu_{ext})^2}{\sigma_{ext}^2} \right] * \|n_{x_i}\|$$

end;

for $i := 1$ to $M$ do $$x_i = x_i - \epsilon d_i * \frac{n_{x_i}}{\|n_{x_i}\|}$$

end;

end;

As previously discussed, this procedure is suited for image processing associated with image registration. FIG. 3 illustrates an application of this method to medical images. FIG. 3 includes four windows 300, 302, 304, and 306. Windows 300, 304, and 306 contain sagittal, axial, and coronal views of a three-dimensional MRI of a patient's brain containing mass effect tumor 308. An operator draws an initial seed region 310 in any one of the views, using for example a computer pointing device to select one or more image data elements that correspond to the tumor. Alternatively, software can determine the boundary of a seed region, by for example, selecting a group of image data elements falling in a selected bin of a histogram for the image. The location of this seed region is also shown in each of the other views. Window 302 is a wireframe representation of the selected seed region in its initial condition prior to growing it to encompass the tumor. As mentioned above, the seed region can be, for example, a single point, a two-dimensional area, or a three-dimensional volume.

Figure 4:
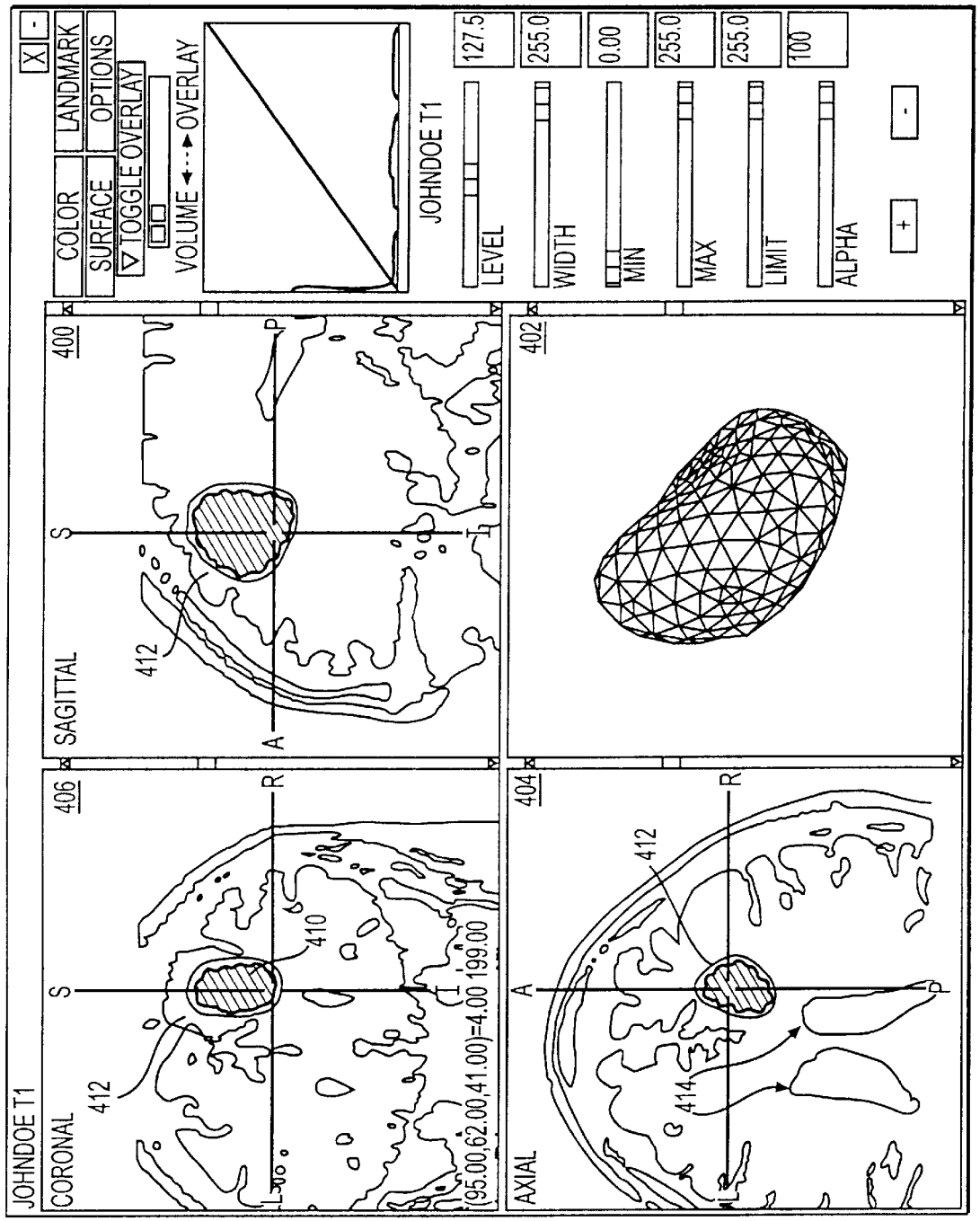
FIG. 4 is a computer display of coronal, sagittal, and axial views of a head image containing a tumor with an identified tumor region.

FIG. 4 shows the four windows of FIG. 3 after growing the seed region to encompass tumor as windows 400, 402, 404, and 406, respectively. Windows 400, 404, and 406 contain sagittal, axial, and coronal views of a three-dimensional MRI of a patient's brain after growing the seed region. As seen in FIG. 4, what was an initial region 310 in window 306 has grown to region 410 in window 406. In accordance with the method, region 410 was grown to maximize the volume of the tumor contained in the region, while avoiding extending 410 to encroach on normal tissue in the image. In this example, all of the tumor tissue has not been completely contained in region 410, however the results can be improved by allowing additional iterations of the method and/or refining the definitions of the intensity or texture models used for the tumor or normal tissue. FIG. 4 shows coronal, sagittal, and axial views of an image where the tumor image boundary 412 has been automatically identified using the method of FIG. 1. Window 402 is a wireframe of the three-dimensional region after growing it to cover the tumor. Accordingly, by applying this method, the region of the image occupied by the tumor is automatically located and segmented from the remainder of the image.

FIG. 5 is a flow diagram of an image processing method for automatically removing an object embedded in a deformable substance. Here again, the method is applicable to processing many types of images including, but not limited to, medical images. This method is especially suited for removing tumors from medical images because as certain tumors grow in the brain, the tumors deform the structures in the brain. The method begins with an image with an identified object boundary separating the object from the substance into which the object is embedded. The object boundary can be automatically identified using, for example, the method of FIG. 1. In another embodiment consistent with the present invention, the region in the image representing the object to be removed can be identified by an operator using, for example, a mouse or other pointing device to trace the object boundary on a digital representation of the image (step 500).

At step 502, a transform is automatically computed such that when the transform is applied to the image the tumor region shrinks, preferably to a single point. The transform that is computed not only shrinks the tumor region, but also predicts the shape of the normal anatomy after removal of the tumor. At step 504 the computed transform is applied to the image with the tumor so that the size of the region of interest is reduced and the normal shape of the image without the object in the region of interest is restored. In other words, the method reverses the deformation caused by the introduction of the object in the region of interest. Accordingly, reducing the size of the image area occupied by the tumor (or reducing the proportionate size of the tumor region by enlarging or emphasizing other areas of the image), can reduce the amount of data that can skew the registration process.

Figure 6:
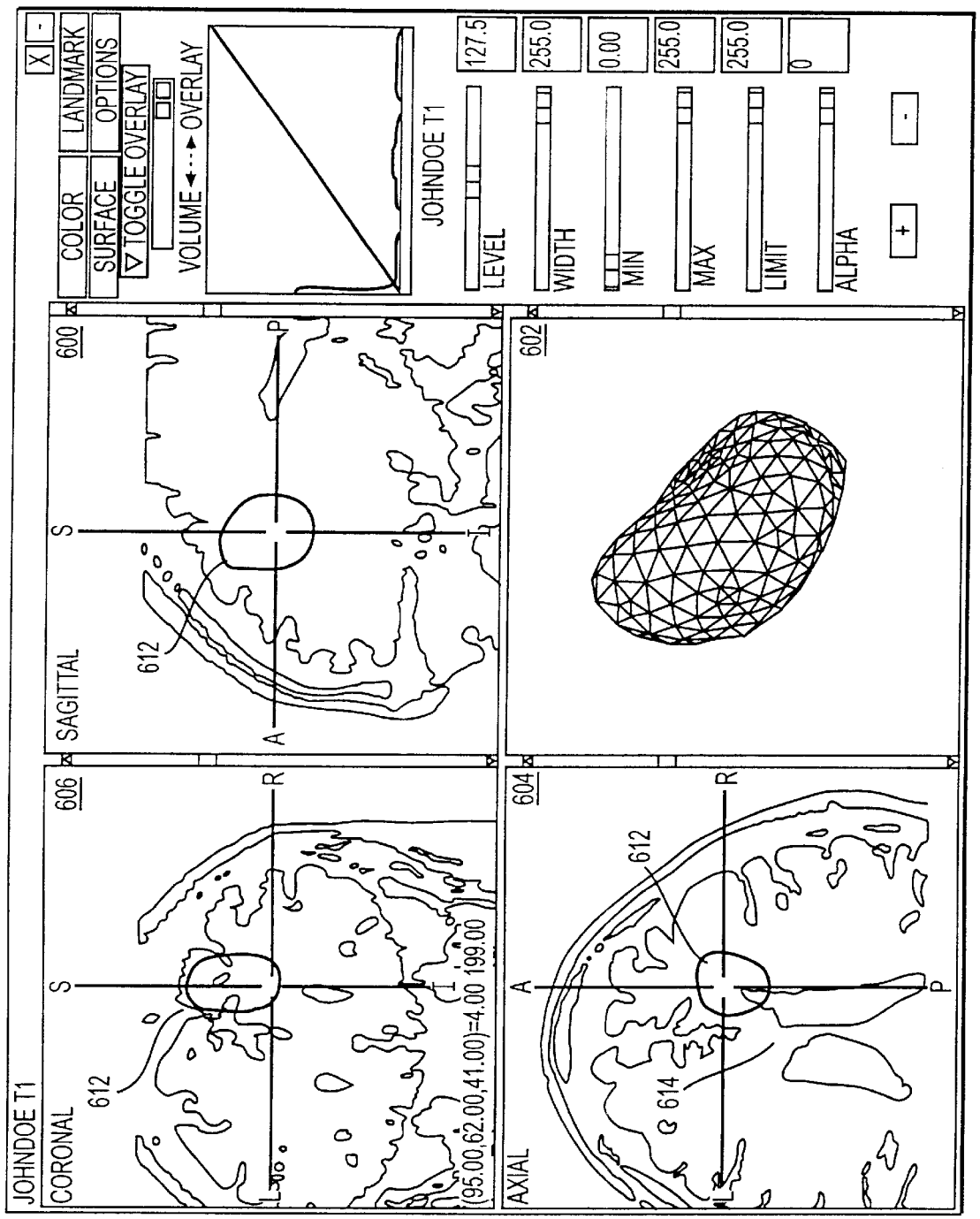
FIG. 6 is a computer display of coronal, sagittal, and axial views of a head image after a tumor has been removed from the image using image processing in accordance with the present invention.

FIG. 6 shows coronal (606), sagittal (600), and axial (604) views of the image after the operation of step 504 described above restores the image to remove the tumor. Note in the restored image, two objectives have been accomplished. First, the tumor has been removed from the image. 612 corresponds to the location of the tumor boundary prior to removal. Second, the representation of the anatomical structures has been restored to their normal characteristics, i.e., pre-tumor shape and density. Compare, for example, ventricle region 414 in the axial image in FIG. 4 with the corresponding representation of the ventricle region 614 in image 606 where the tumor has been electronically removed by applying the computed transform. FIG. 6 shows that the result of the image processing described herein restores the representation in the image of the ventricle region and surrounding tissue to their normal appearance with window 602 illustrating a wireframe of the three-dimensional region.

In many image processing applications, libraries containing reference images are used to restore, modify, or classify target images. These applications include generating a composite image for a physician to use in planning radiation therapy to remove a tumor. These libraries are also used to build image models that incorporate reference image and target image data. Images in these libraries are known in the art as "atlases" or "atlas images." Atlases are used, for example, to compare image data in the target image with corresponding image data in an atlas. During registration, a correlation or mapping is computed of corresponding image data elements among images. Many computational techniques for automatically comparing atlas and target images fail because of anomalies in the target image that distort the target image to such a degree that correlations between the atlas and target images are difficult to determine.

To overcome these limitations, two approaches consistent with the present invention compensate for anomalies in the target imagery to improve the ability to exploit atlas images. In the first approach, the target image is transformed in accordance with, for example, the method of FIG. 5, described in greater detail above, to remove the appearance of the anomaly in the image prior to relating the target image to a corresponding atlas image. In the second approach, the target image and the atlas image are compared at points where the target image has not been distorted by an anomaly, compared after filtering target image data elements that have been distorted by an anomaly. These two techniques will be described in greater detail below.

In some imaging modalities, mass-effect tumors appear as discrete regions of dark pixels in an image. See, for example, tumor region 410 in FIG. 4 is consistent with a mass-effect tumor. An embodiment consistent with the present invention maps an atlas image to a target image containing representations of discrete anomalies by mapping the atlas image data to the target image at locations corresponding to anatomy that has not been affected by the tumor. Using this technique, the mapping process will not be skewed or confused by regions in the target image that have been corrupted by the presence of the anomaly.

Consider a pathological anatomical image referred to as $I(x)$, where x is a data element in the image in a region of interest $\Omega$. The image contains a mass-effect tumor occupying a sub-region $\tau$ in region $\Omega$. A reference library contains at least one corresponding normal anatomic atlas image $T(x)$ that does not contain a tumor. The objective is to generate a composite image that combines the atlas $T(x)$ and the target image $I(x)$ by mapping corresponding data in both images.

The method begins with the step of identifying the sub-region in the image representing a tumor (FIG. 7, step 702). This step can be accomplished in a number of ways. An operator can outline the sub-region of the image displayed on a screen using a pointing device. Automated methods can also be used to identify the tumor sub-region. These automated methods include image edge detection algorithms known in the art and region growing techniques such as the procedure described in greater detail above.

Once the tumor sub-region is identified, a transform $h_1(x)$ is computed that shrinks the tumor sub-region of the target image to a single data element. The transform preferably restores the image to a state where structures have a normal appearance while reducing the size of the tumor. The computed transform $h_1(x)$ is then applied to the target image to generate a normal image (step 704). The foregoing steps are preferably executed in accordance with the procedure described in detail above for removing an object embedded in a deformable substance.

Once a normal appearing image has been generated, a second transform $h_2(x)$ is computed for mapping the corresponding atlas image and the generated normal image (step 706). The second transform used for mapping is preferably generated using image registration techniques such as, for example, the techniques described in U.S. patent application Ser. Nos. 08/678,628 and 09/186,359, incorporated by reference herein in their entirety.

Next, a third transform $h_3(x)$ is generated from the first and second transforms (step 708). The third transform is preferably composed from the inverse of the first transform and the second transform; i.e., $h_3(x)=h_1(x)^{-1} \circ h_2(x)$. The third transform is applied to map the atlas image to the original target image, the image that contains a tumor region (step 710). According to this approach, a mapping between the atlas image and the target image containing a tumor is generated in a way that reduces the potential errors that are often introduced when transformations are generated using image data representing the tumor.

Some anomalies that appear in images are infused with the image and are not easy to isolate, shrink, and reverse displacement caused by the anomaly. One type of such anomalies are infiltrating tumors. Examples of infiltrating tumors include tumors that change the tissue characteristics but do not displace the normal tissue. Rather than trying to shrink a region in an image corresponding to an infiltrating tumor prior to mapping the image with an atlas image, a method consistent with the present invention filters the tumor region when computing a map relating the atlas and the target. An embodiment of such a filter consistent with the present invention excludes image data elements corresponding to the tumor region. One skilled in the art will recognize that there are other suitable filters with varying weights that can be applied to image data elements.

Consider the pathological anatomical image $I(x)$. Here again, x is a data element in the image in a region of interest $\Omega$. The image contains an infiltrating tumor occupying a sub-region $\tau$ in region $\Omega$. In this process the distance function used in atlas mapping methods such as, for example, those disclosed in U.S. patent application Ser. Nos. 08/678,628 and 09/186,359, is modified to accommodate this pathology. U.S. patent application Ser. Nos. 08/678,628 and 09/186,359 disclose an image mapping process that uses a distance measure D, defining the disparity between a template image transformed to target image $I(x)$, $T(h(x))$, and image $I(x)$. An equation for expressing this disparity is:

$$\int_\Omega D(I(x), T(h(x)))dx,$$

wherein $\Omega$ is a region of interest in the target image $I(x)$, $h(x)$ is a transform for transforming data elements in target image $I(x)$ to corresponding data elements in atlas image $T(x)$. This form of disparity measure is effective at mapping normal target images, i.e., images without anomalies, to atlas images.

Pathological anatomical target images, e.g., target images containing an infiltrating tumor, have had the normal tissue characteristics changed in the region of the infiltrating tumor in a sub-region X in region $\Omega$. To accommodate these kinds of anomalies, the above disparity equation is preferably modified so that the measure of disparity excludes the sub-region $\tau$ when comparing the target image and the transformed atlas image. Thus, the preferred disparity measure is:

$$\int_{\Omega/\tau} D(I(x), T(h(x)))dx,$$

Note that the range of integration in this disparity measure is computed over the region of the anatomy that has not changed.

If information is available to generate a mathematical model for predicting how the anomaly in the target image changes data element values, a further modification of the disparity measure is preferably used:

$$\int_{\Omega/\tau} D(I(x), T(h(x)))dx + \int_\tau D(F(I(x)), T(h(x)))dx,$$

where F is a function that incorporates a mathematical model that maps data element values in the sub-region containing an infiltrating tumor corresponding to the data element values in a normal image. The function F will exploit any information available about the relationship between data elements in the tumor region and what value those elements would have if the image were normal. Information such as the mean intensity value and the variance of the intensity values can be used to generate the function F, assuming for example, image element intensity values adhere to a Gaussian model.

To represent shape abnormalities assume that the anatomy is enclosed in a bounded rectangular background space $\Omega \subset R^3$ and preferably use the variability operator $$L = \Delta + a;$$

where $\alpha$ is a constant having a value less than zero, and with Dirichlet boundary conditions on $\partial\Omega$. Making $\alpha$ negative ensures non-singularity and existence of a solution to the problem below. For simplicity, assume the three components of the deformation field $u(x)$; $x \in \Omega$ are independent; for the coupled case replace L by the Navier operator.

Let c, the location of an image data element in the region of interest $\Omega$, be the center of an expanding abnormality that expands into a sub-region $\tau$ in $\Omega$. For example, $\tau$ could be a ball with the center at c. More general shapes are also suitable for this approach. The "normal" remainder will be denoted $N = \Omega/\tau$. The observed image is represented as follows:

$$I^P(x) = I_{temp}[h(x)] = I_{temp}[x + u(x)]$$

so that we are led to the following field equation for the pathology induced displacement $$(Lu)(x) = (\Delta u)(x) + au(x) = 0; x \in N$$

with the boundary condition $$u(x) = u_\tau(x) = c - u; x \in \partial\tau$$

$$u(x) = 0; x \in \partial\Omega$$

Note that $u(\cdot)$ preferably should not be defined in the abnormal region $\tau$. One skilled in the art will recognize that this is in the form of a Freedholm equation that can be computed directly using, for example, an over-relaxation scheme as described in the text *Numerical Recipes in C*, section 17.5.

While the disclosed system and method is useful for medical imaging systems used for noninvasive exploration of human anatomy, for example, computed tomography (CT) and magnetic resonance imaging (MRI), this invention can also be used on images acquired from other imaging modalities. Furthermore, application of the present invention is not limited to anatomical images. This invention also applies to non-anatomical images, including, but not limited to, satellite imagery, photographs, radar images, and images acquired from multiple It will be apparent to those skilled in the art that various modifications and variations can be made to the disclosed embodiments of the present invention without departing from the spirit or scope of the invention. Thus it is intended that the present invention cover the modifications and variations of this invention provided they come within the scope of the appended claims and their equivalents.

We claim:

1. A method for identifying a target object in an image, comprising the steps of:

identifying a seed region containing one or more image data elements representing the target object;

defining a target model of a target subset of image data elements representing the target object, wherein the target subset defines a distribution of gray scale values;

defining a background model of a background subset of image data elements representing structure in the image other than the target object, wherein the background subset defines a distribution of gray scale values; and growing the seed region by increasing the number of the image data elements contained in the seed region representing the target object as a function of the target model while reducing the number of the image data elements contained in the seed region representing structure other than the target object as a function of the background model.

2. The method of claim 1, wherein the step of defining a target model further comprises the substep of:

defining a texture target model and/or intensity target model.

3. The method of claim 1, wherein the step of defining a background model further comprises the substep of:

defining a texture background model and/or intensity background model.

4. The method of claim 1, wherein the step of growing the seed region further comprises the substep of:

maximizing the number of the image data elements contained in the seed region representing the target object as a function of the target model while minimizing the number of the image data elements contained in the seed region representing structure other than the target object as a function of the background model.

5. The method of claim 1, wherein the step of growing the seed region further comprises the substep of:

growing the seed region elastically.

6. A method for registering a first and a second image, wherein the second image contains a target object not contained in the first image, comprising the steps of:

identifying a seed region in the second image containing one or more image data elements representing the target object;

defining a target model of a target subset of image data elements representing the target object, wherein the target subset defines a distribution of gray scale values;

defining a background model of a background subset of image data elements representing structure in the image other than the target object, wherein the background subset defines a distribution of gray scale values;

growing the seed region in the second image by increasing the number of the image data elements contained in the seed region representing the target object as a function of the target model while reducing the number of the image data elements contained in the seed region representing structure other than the target object as a function of the background model;

transforming the second image to reduce the size of the grown seed region; and registering the first image and the transformed second image.

7. The method of claim 6 wherein the step of transforming produces a transformed second image that excludes image data elements representing the target object.

8. A method for identifying a tumor in an image, comprising the steps of:

identifying a seed region containing one or more image data elements representing the tumor;

defining a target model of a target subset of image data elements representing the tumor, wherein the target subset defines a distribution of gray scale values;

defining a background model of a background subset of image data elements representing structure in the image other than the tumor, wherein the background subset defines a distribution of gray scale values; and growing the seed region by increasing the number of the image data elements contained in the seed region representing the tumor as a function of the target model while reducing the number of the image data elements contained in the seed region representing structure other than the tumor as a function of the background model.

9. A method for registering a first and a second image, wherein the second image contains a tumor not contained in the first image, comprising the steps of:

identifying a seed region in the second image containing one or more image data elements representing the tumor;

defining a target model of a target subset of image data elements representing the tumor, wherein the target subset defines a distribution of gray scale values;

defining a background model of a background subset of image data elements representing structure in the image other than the tumor, wherein the background subset defines a distribution of gray scale values;

growing the seed region in the second image by increasing the number of the image data elements contained in the seed region representing the tumor as a function of the target model while reducing the number of the image data elements contained in the seed region representing structure other than the tumor as a function of the background model;

transforming the second image to reduce the size of the grown seed region; and registering the first image and the transformed second image.

10. The method of claim 9 wherein the step of transforming produces a transformed second image that excludes image data elements representing the tumor.

11. A method for generating a radiation treatment plan using a first image and a second image, said second image containing a target object not contained in the first image, comprising the steps of:

identifying a seed region in said second image containing one or more image data elements representing the target object;

growing the seed region by increasing the number of the image data elements representing the target object contained in said seed region while reducing the number of the image data elements representing structure other than the target object contained in said seed region;

transforming the second image to reduce the size of the grown seed region containing the target object; and registering the first image and the transformed second image to produce a composite image for radiation treatment.

12. The method of claim 11 wherein the step of transforming produces a transformed second image that excludes image data elements representing the target object.

13. An apparatus for identifying a tumor in an image comprising:

means for identifying a seed region containing one or more image data elements representing the tumor;

means for defining a target model of a target subset of image data elements representing the tumor, wherein the target subset defines a distribution of gray scale values;

means for defining a background model of a background subset of image data elements representing structure in the image other than the tumor, wherein the background subset defines a distribution of gray scale values; and means for growing the seed region by increasing the number of the image data elements contained in the seed region representing the tumor as a function of the target model while reducing the number of the image data elements contained in the seed region representing structure other than the tumor as a function of the background model.

14. An apparatus for registering a first and a second image, wherein the second image contains a tumor not contained in the first image, comprising:

means for identifying seed region in the second image containing one or more image data elements representing the tumor;

means for defining a target model of a target subset of image data elements representing the tumor, wherein the target subset defines a distribution of gray scale values;

means for defining a background model of a background subset of image data elements representing structure in the second image other than the tumor, wherein the background subset defines a distribution of gray scale values;

means for growing in the second image the seed region by increasing the number of the image data elements contained in the seed region representing the tumor as a function of the target model while reducing the number of the image data elements contained in the seed region representing structure other than the tumor as a function of the background model;

means for transforming the second image to reduce the size of the grown seed region; and means for registering the first image and the transformed second image.

15. The apparatus of claim 14 wherein the means for transforming produces a transformed second image that excludes image data elements representing the tumor.

16. An apparatus for generating a radiation treatment plan using a first image and a second image, said second image containing a target object not contained in the first image, comprising:

means for identifying a seed region in said second image containing one or more image data elements representing the target object;

means for growing the seed region by increasing the number of the image data elements contained in the seed region representing the target object while reducing the number of the image data elements contained in the seed region representing structure other than the target object;

means for transforming the second image to reduce the size of the grown seed region containing the target object; and means for registering the first image and the transformed second image to produce a composite image for radiation treatment.

17. An article of manufacture for identifying a tumor in an image comprising:

a module configured to cause a computer to identify a seed region containing one or more image data elements representing the tumor;

a module configured to cause the computer to define a target model of a target subset of image data elements representing the tumor, wherein the target subset defines a distribution of gray scale values;

a module configured to cause the computer to define a background model of a background subset of image data elements representing structure in the image other than the tumor, wherein the background subset defines a distribution of gray scale values; and a module configured to cause the computer to grow the seed region by increasing the number of the image data elements contained in the seed region representing the tumor as a function of the target model while reducing the number of the image data elements contained in the seed region representing structure other than the tumor as a function of the background model.

18. An article of manufacture for registering a first and a second image, wherein the second image contains a tumor not contained in the first image, comprising:

a module configured to cause a computer to identify a seed region in the second image containing one or more image data elements representing the tumor;

a module configured to cause the computer to define a target model of a target subset of image data elements representing the tumor, wherein the target subset defines a distribution of gray scale values;

a module configured to cause the computer to define a background model of a background subset of image data elements representing structure in the second image other than the tumor, wherein the background subset defines a distribution of gray scale values;

a module configured to cause the computer to grow the seed region in the second image by increasing the number of the image data elements contained in the seed region representing the tumor as a function of the target model while reducing the number of the image data elements contained in the seed region representing structure other than the tumor as a function of the background model;

a module configured to cause the computer to transform the second image to reduce the size of the grown seed region; and a module configured to cause the computer to register the first image and the transformed second image.

19. The article of manufacture of claim 18 wherein the module configured to cause the computer to transform produces a transformed second image, wherein the transformed second image excludes image data elements representing the tumor.

20. An article of manufacture for generating a radiation treatment plan using a first image and a second image, said second image containing a target object not contained in the first image, comprising:

a module configured to cause a computer to identify a seed region in said second image containing one or more image data elements representing a target object;

a module configured to cause the computer to grow the seed region by increasing the number of the image data elements contained in the seed region representing the target object while reducing the number of the image data elements contained in the seed region representing structure other than the target object;

a module configured to cause the computer to transform the second image to reduce the size of the grown seed region containing the target object; and a module configured to cause the computer to register the first image and the transformed second image to produce a composite image for radiation treatment.

21. An apparatus for identifying a target object in an image comprising:

means for identifying a seed region containing one or more image data elements representing the target object;

means for defining a target model of a target subset of image data elements representing the target object, wherein the target subset defines a distribution of gray scale values;

means for defining a background model of a background subset of image data elements representing structure in the image other than the target object, wherein the background subset defines a distribution of gray scale values; and means for growing the seed region by increasing the number of the image data elements contained in the seed region representing the target object as a function of the target model while reducing the number of the image data elements contained in the seed region representing structure other than the target object as a function of the background model.

22. The apparatus of claim 21, wherein the means for defining a target model further comprises:

means for defining a texture target model and/or intensity target model.

23. The apparatus of claim 21, wherein the means for defining a background model further comprises:

means for defining a texture background model and/or intensity background model.

24. The apparatus of claim 21, wherein the means for growing the seed region further comprises:

means for maximizing the number of the image data elements contained in the seed region representing the target object as a function of the target model while minimizing the number of the image data elements contained in the seed region representing structure other than the target object as a function of the background model.

25. The apparatus of claim 21, wherein the means for growing the seed region further comprises:

means for growing the seed region elastically.

26. An apparatus for registering a first and a second image, wherein the second image contains a target object not contained in the first image, comprising:

means for identifying a seed region in the second image containing one or more image data elements representing the target object;

means for defining a target model of a target subset of image data elements representing the target object, wherein the target subset defines a distribution of gray scale values;

means for defining a background model of a background subset of image data elements representing structure in the second image other than the target object, wherein the background subset define defines a distribution of gray scale values;

means for growing the seed region in the second image by increasing the number of the image data elements contained in the seed region representing the target object as a function of the target model while reducing the number of the image data elements contained in the seed region representing structure other than the target object as a function of the background model;

means for transforming the second image to reduce the size of the grown seed region; and means for registering the first image and the transformed second image.

27. The apparatus method of claim 26 wherein the means for transforming produces a transformed second image that excludes image data elements representing the target object.

28. An article of manufacture for identifying a target object in an image comprising:
- a module configured to cause a computer to identify a seed region containing one or more image data elements representing the target object;
- a module configured to cause the computer to define a target model of a target subset of image data elements representing the target object, wherein the target subset defines a distribution of gray scale values;
- a module configured to cause the computer to define a background model of a background subset of image data elements representing structure in the image other than the target object, wherein the background subset defines a distribution of gray scale values; and
- a module configured to cause the computer to grow the seed region by increasing the number of the image data elements contained in the seed region representing the target object as a function of the target model while reducing the number of the image data elements contained in the seed region representing structure other than the target object as a function of the background model.

29. The article of manufacture of claim 28, wherein the module configured to cause the computer to define a target model further comprises:
- a module configured to cause the computer to define a texture target model and/or intensity target model.

30. The article of manufacture of claim 28, wherein the module configured to cause the computer to define a background model further comprises:
- a module configured to cause the computer to define a texture background model and/or intensity background model.

31. The article of manufacture of claim 28, wherein module configured to cause the computer to grow the seed region further comprises:
- a module configured to cause the computer to maximize the number of the image data elements contained in the seed region representing the target object as a function of the target model while minimizing the number of the image data elements contained in the seed region representing structure other than the target object as a function of the background model.

32. The article of manufacture of claim 28, wherein the module configured to cause the computer to grow the seed region further comprises:
- a module configured to cause the computer to grow the seed region elastically.

33. An article of manufacture for registering a first and a transformed second image, wherein the transformed second image contains a target object not contained in the first image, comprising:
- a module configured to cause a computer to identify a seed region in the second image containing one or more image data elements representing the target object;
- a module configured to cause the computer to define a target model of a target subset of image data elements representing the target object, wherein the target subset defines a distribution of gray scale values;
- a module configured to cause the computer to define a background model of a background subset of image data elements representing structure in the second image other than the target object, wherein the background subset defines a distribution of gray scale values;
- a module configured to cause the computer to grow the seed region in the second image by increasing the number of the image data elements contained in the seed region representing the target object as a function of the target model while reducing the number of the image data elements contained in the seed region representing structure other than the target object as a function of the background model;
- a module configured to cause the computer to transform the second image to reduce the size of the grown seed region; and
- a module configured to cause the computer to register the first image and the transformed second image.

34. The article of manufacture of claim 33 wherein the module configured to cause the computer to transform produces a transformed second image which excludes image data elements representing the target object.

* * * * *